United States Patent [19]

Sen-Tein

[11] Patent Number: 4,981,160
[45] Date of Patent: Jan. 1, 1991

[54] STRUCTURE OF WATER TAP WITH IMPROVED FLOW RATE CONTROL MECHANISM

[76] Inventor: Shih Sen-Tein, I Hsing Village No. 18., Alley 70, Lane I Ya, Hsiu Shui Hsiang, Changhua, Taiwan

[21] Appl. No.: 526,635

[22] Filed: May 22, 1990

[51] Int. Cl.⁵ ............................................. F16K 21/16
[52] U.S. Cl. ..................... 137/801; 137/550; 251/52; 251/339
[58] Field of Search .................. 137/550, 801; 251/51, 251/52, 339

[56] References Cited

U.S. PATENT DOCUMENTS 4,456,222 6/1984 Shen .............................. 251/339 X Primary Examiner—Gerald A. Michalsky
Attorney, Agent, or Firm—Bacon & Thomas

[57] ABSTRACT

A water tap, which comprises a housing having an outer cap mounted on its water supply outlet to secure therein a water intake cap, a control shaft, a control bolt and a ring-shaped element. The control shaft comprises an upper circular groove with a stop cock mounted thereon, and a lower circular groove with a ring-shaped water seal mounted thereon. When the control shaft is pushed upward, water flow is permitted to pass through water inlet holes on the water intake cap for discharging out of the outer cap. When pressure force is released from the control shaft, water flow is accumulated in the inner space of the water intake cap and the inner space of the control shaft permitting water pressure to force the control shaft to move downward so as to block up water supply. The control bolt can be turned to move up and down inside the control shaft so as to control the flow rate through the throughholes around the periphery of the control shaft.

5 Claims, 2 Drawing Sheets

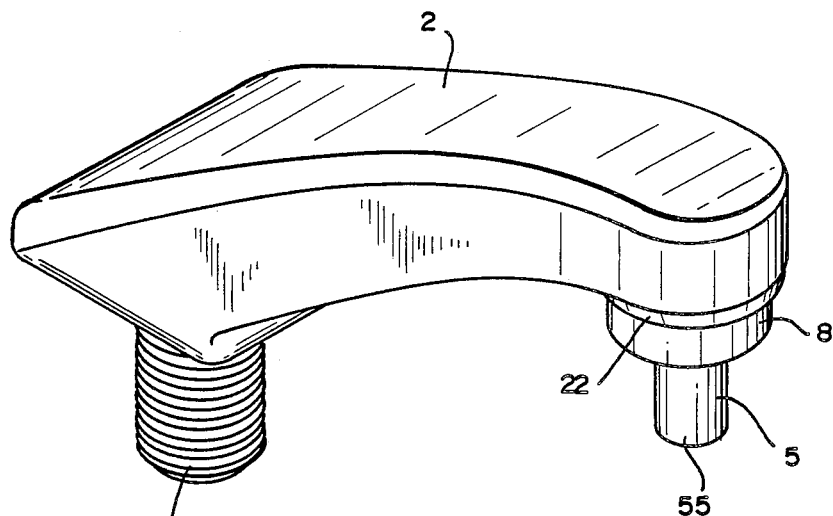
FIG. 2
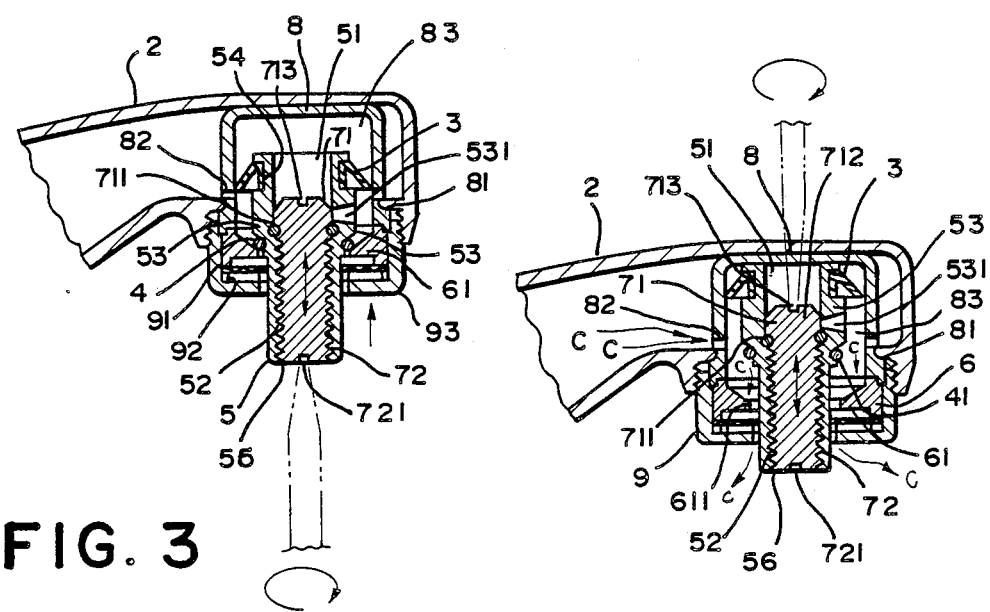
FIG. 3
FIG. 4

STRUCTURE OF WATER TAP WITH IMPROVED FLOW RATE CONTROL MECHANISM

BACKGROUND OF THE INVENTION

1. Field of the Invention

The present invention is related to water taps and more particularly to a water tap which has an upstroke control shaft to control the supply of water flow and gradually stop water supply by means of water pressure.

2. Description of the Prior Art

Regular water taps or water flow rate controllers are generally operated through swivel control or pressbutton control. Either swivel control type or pressbutton control type of water taps, water flow must be stopped by hand operation. Therefore, it is inevitable that one's either hand must touch a water tap again to block up water supply after one's hands have been well washed. Under this condition, one's hands may be contaminated against each time after washing.

There is still a kind of water tap commonly used in railway carriages, which comprises a control shaft for water flow rate control. When the control shaft is pushed up inside the housing, a water passage is opened for passing of water therethrough. Upon releasing of upward pressure, the control shaft is automatically pushed to move back to original position by a spring to block up water supply. This design is not convenient for use to discharge water for washing the hand since water is permitted to discharge only when the control shaft is pushed to an upper limit position. It is inconvenient to rub one hand against the other during washing, while one hand is used to support the control shaft.

Further, the water flow rate of a water tap may vary with its installation location from a water supplying source. In regular water taps, there is no any mechanism available for regulating water flow rate according to the water pressure from a water supplying source.

SUMMARY OF THE INVENTION

The present invention has been accomplished under the circumstances in view. It is an object of the present invention to provide a water tap which stops water supply by means of water pressure so as to efficiently protect the hand against contamination while washing.

Another object of the present invention is to provide a water tap which is inexpensive to manufacture and easy to assemble.

Still another object of the present invention is to provide a water tap which is suitable for use in public place to eliminate waste of water.

According to a first aspect of the present invention, a water tap comprises a housing having an outer cap mounted on its water supply outlet to secure therein a water intake cap, a control shaft and a ring-shaped element, in which the control shaft can be pushed upward to permit water flow to discharge out of the outer cap or released to permit water pressure to force the control shaft to move downward to original position so as to block up water supply.

According to a second aspect of the present invention, a water tap comprises a control shaft to control water flow, which control shaft comprises a plurality of through-holes around its periphery each of which is designed in a tapered bore with a wider opening disposed at the outer side and a narrower opening at the inner side so that water is permitted to smoothly flow therethrough inside the inner space therein.

According to a third aspect of the present invention, a water tap is comprised of a housing having an outer cap mounted on its water supply outlet to secure therein a water intake cap, a control shaft, a control bolt and a ring-shaped element, in which the control shaft has a circular groove with a ring-shaped water seal mounted thereon to seal the gap between the outer cap by means of water pressure so as to efficiently block up water supply and protect the ring-shaped water seal from deformation.

According to a fourth aspect of the present invention, a water tap is comprised of a housing having an outer cap mounted on its water supply outlet to secure therein a water intake cap, a control shaft, a control bolt and a ring-shaped element, in which the control bolt has a tapered head portion movably fastened inside the control shaft to control the range of opening of the through-holes around the periphery of the control shaft so as to further control the flow rate of water therethrough into the inner space of the water intake cap to produce a pressure to move down the control shaft to block up water supply.

BRIEF DESCRIPTION OF THE DRAWINGS

The foregoing and other objects, features and advantages of the present invention will be best understood from the following description, the appended claims and the accompanying drawings in which:

FIG. 2 is a perspective assembly view thereof;

FIG. 3 is a partly sectional view thereof, illustrating the operation of the present invention to discharge water; and FIG. 4 is a partly sectional view thereof, illustrating the operation of the present invention to stop water supply.

DETAILED DESCRIPTION OF THE PREFERRED EMBODIMENT

Figure 1:
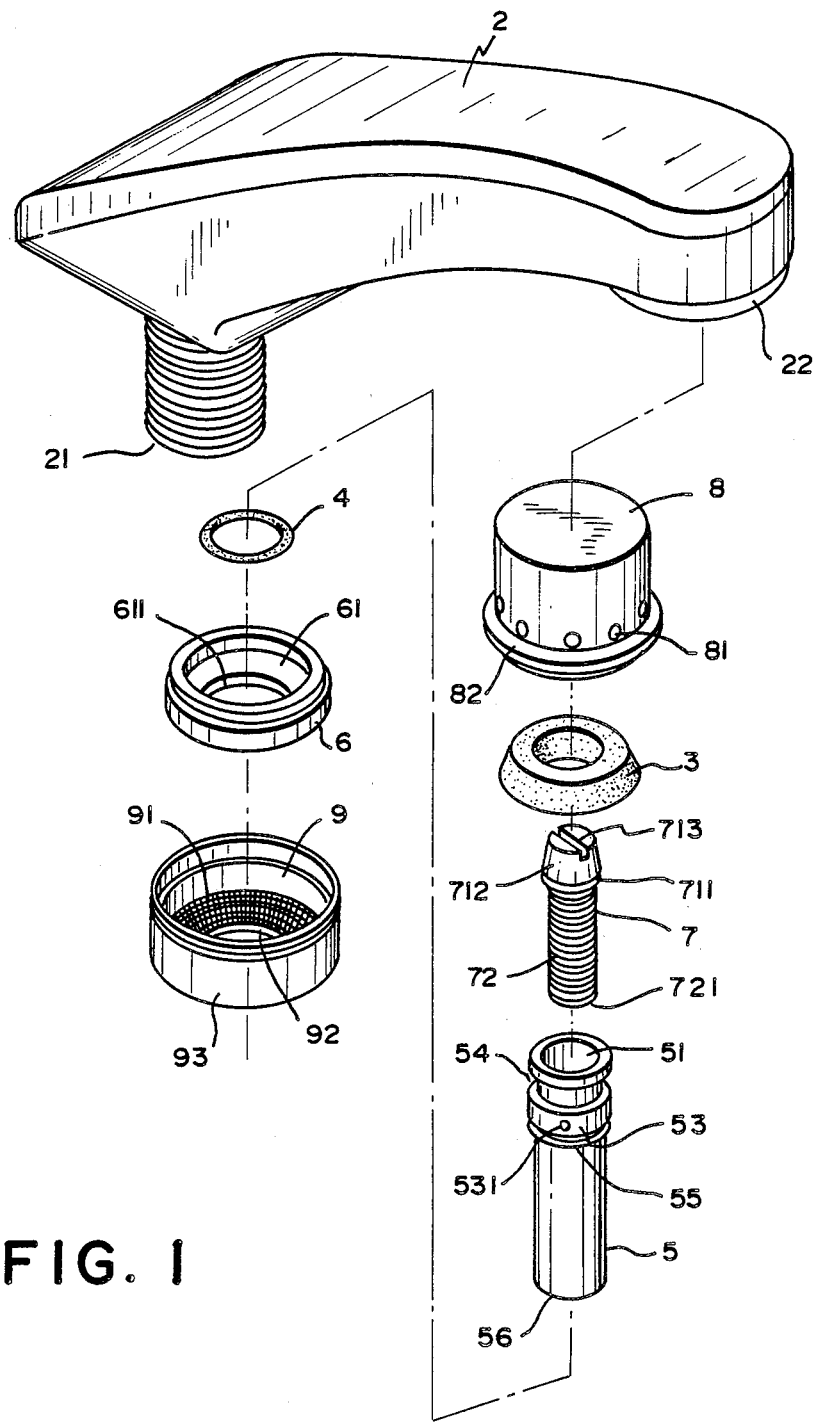
FIG. 1 is a perspective exploded view of a water tap embodying the present invention.

Referring to FIGS. 1 and 2, therein illustrated is a water tap embodying the present invention and generally comprised of a housing 2, a stop cock 3, a ring-shaped water seal 4, a control shaft 5, a ring-shaped element 6, a control bolt 7, a water intake cap 8 and an outer cap 9.

The housing 2 has a cold water inlet 21 and a single water supply outlet 22. It can be a vertical type or any other types suitable for mounting on a wall.

The stop cock 3 is sleeved on the control shaft 5 at an upper position and set in a water chamber 83 inside the water intake cap 8.

The ring-shaped water seal 4 is sleeved on the control shaft 5 at a middle position to seal the gap between the control shaft 5 and the inner projection 61 of the ring-shaped element 6 so as to stop water flow A from flowing through the center hole 611 of the ring-shaped element 6 which serves as a water outlet hole of the water tap.

The control shaft 5 is a hollow rod comprising internally an inner thread portion 52 defining therein a receiving space 51, and comprising externally a collar 53 at an upper position and having a plurality of through-holes 531 around its periphery, an upper circular groove 54 and a lower circular groove 55 respectively for the positioning thereon of the stop cock 3 and the ring-shaped water seal 4.

The ring-shaped element 6 has a tapered, ring-shaped inner projection 61 defining therein a center hole 611 for passing of water flow.

The control bolt 7 comprises an elongated outer thread portion 72 extending downward from a head portion 71. The outer thread portion 72 has a groove 721 made on its bottom end. The head portion 71 has a tapered side-wall 712 mounted with an O-ring 711, and a groove 713 on its top edge.

The water intake cap 8 comprises a flange 82 on its outer wall at a lower position and a plurality of water inlet holes 81 around its periphery right above the flange 82, and defines therein a water chamber 83.

The outer cap p comprises a circular casing 93 having set therein a ring-shaped wire gauze filter 91 which is incorporated with a ring plate 92.

The above parts are assembled into a water tap according to the following procedure. The ring-shaped element 6 is set in the outer cap g on the ring-shaped wire gauze filter 91. The bottom end 56 of the control shaft 5 is inserted through the center hole 611 of the inner projection 61 of the ring-shaped element 6 to protrude beyond the outer cap 9, permitting the ring-shaped water seal 4 which is mounted on the lower circular groove 55 of the control shaft 5 to seal the gap between the inner projection 61 of the ring-shaped element 6. The control bolt 7 is then fastened inside the receiving space 51 of the control shaft 5 with its outer thread portion 72 screwed up with the inner thread portion 52 of the control shaft 5 permitting the O-ring 711 to internally seal the through-holes 531. Then, the water intake cap 8 is mounted on the ring-shaped element 6 to receive the upper end of the control shaft 5 inside its water chamber 83. Then, the casing 93 of the outer cap g is screwed up with the water supply outlet 22 of the housing 2 to secure the water intake cap 8 inside the water supply outlet 22 of the housing 2 permitting the flange 82 of the water intake cap 8 to stop at the bottom end of the water supply outlet 22 (see FIG. 2).

The operation of the present invention is outlined hereinafter, with reference to FIGS. 3 and 4. Push the bottom end 56 of the control shaft 5 toward the housing 2 to separate the ring-shaped water seal 4 from the inner projection 61 of the ring-shaped element 6 permitting cold water C from the cold water inlet 21 of the housing 2 to flow through the water inlet holes 81 into the water chamber 83 of the water intake cap 8 to further flow out of the outer cap 9 via the center hole 611 of the inner projection 61 of the ring-shaped element 6 so as to provide clean water for washing (see FIG. 3). As soon as the push force is released from the control shaft 5, water flow C immediately flows through the water inlet holes 81 of the water intake cap 8 and the through-holes 531 of the collar 53 of the control shaft 5 into the receiving space 51 and is simultaneously stopped by the stop cock 3 to fill in the water chamber 83 of the water intake cap 8. As soon as discharged water flow C is accumulated to a certain quantity the control shaft 5 is forced by water pressure to move downward to simultaneously carry the ring-shaped water seal 4 to tightly stop against the inner projection 6 of the ring-shaped element 6 so as to block up water supply (see FIG. 4).

If the output of water flow is relatively reducing when water pressure is dropping, it will take longer time to accumulate sufficient water in the water chamber 83 to force the control shaft 5 to move to the lower limit. Under this condition, a screw driver can be used to insert in the groove 731 of the control bolt 7 and drive the control bolt 7 to turn downward inside the control shaft 5 permitting the upper smaller part of the tapered side-wall 712 to dispose at the through-holes 531 so that higher flow rate is permitted to flow through the through-holes 531 into the water chamber 83 of the water intake cap 8 to rapidly produce a water pressure sufficient to force the control shaft 5 to move down. During high water pressure condition, sufficient water may be accumulated inside the water chamber 83 within a short period of time to immediately force down the control shaft 5 to block up water supply much earlier than expected. Under this condition, a screw driver can be used to insert in the groove 721 on the bottom end of the outer thread portion 72 of the control bolt 7 and drive the control bolt 7 to turn upward inside the control shaft 5 so as to reduce the opening of the through-holes 531 of the control shaft 5. Thus, it will take longer time to accumulate sufficient water inside the receiving space 51 and the water chamber 83 to further force down the control shaft 5 to block up water supply.

I claim:

1. A water tap, comprising:
   a housing having a cold water inlet and a single water supply outlet and designed in shape convenient for connection to a water supply either vertically or horizontally;
   a control shaft comprising internally an inner thread portion defining therein a receiving space, and comprising externally a collar at an upper position and having a plurality of through-holes around its periphery, an upper circular groove and a lower circular groove;
   a control bolt comprising an elongated outer thread portion extending downward from a head portion, said outer thread portion being fastened with said inner thread portion of said control shaft and having a groove made on its bottom end, said head portion having a tapered side-wall mounted with an O-ring and a groove on its top edge:
   a stop cock mounted on said upper circular groove;
   a ring-shaped water seal mounted on said lower circular groove;
   a ring-shaped element having a tapered, ring-shaped inner projection defining therein a center hole;
   a water intake cap being set inside said water supply outlet of said housing, comprising a flange on its outer wall at a lower position and a plurality of water inlet holes around its periphery right above said flange, and defining therein a water chamber; and
   an outer cap comprising a circular casing having set therein a ring-shaped wire gauze filter and incorporated with a ring plate.

2. The water tap of claim 1, wherein the through-holes on said collar of said control shaft are each designed in a tapered bore with a wider opening disposed at the outer side and a narrower opening at the inner side so that water flow is permitted to smoothly flow therethrough into said receiving space of said control shaft and said water chamber of said water intake cap to produce a pressure sufficient enough to force said control shaft to smoothly move down to a lower limit position so as to block up water supply.

3. The water tap of claim 1, wherein said control shaft is movably secured in said water intake cap beneath said water supply outlet to control discharging of water from said water supply outlet through said outer cap.

4. The water tap of claim 1, wherein said control shaft is pushed toward the housing to separate said ring-shaped water seal from said inner projection of said ring-shaped element permitting water from said cold water inlet of said housing to flow through said water inlet holes into said water chamber of said water intake cap to further flow out of said outer cap via said center hole of said inner projection of said ring-shaped element for washing.

5. The water tap of claim 1, wherein water flow flows through said water inlet holes of said water intake cap and said through-holes of said collar of said control shaft into said receiving space and simultaneously stopped by said cock to fill in said water chamber of said water intake cap to produce a water pressure to force said control shaft to move downward to simultaneously carry said ring-shaped water seal to tightly stopped against said inner projection of said ring-shaped element so as to block up water supply.

* * * * *